Aug. 7, 1956     J. A. BLISS ET AL     2,758,258

ELECTROLYTIC CAPACITOR

Filed May 21, 1953

Inventors
JOSEPH A. BLISS,
PAUL C. LAKIN
JOHN W. MAXWELL
HENRY B. SCHOCH

BY
Nicholas Lamy Jr.
ATTORNEY

United States Patent Office 2,758,258
Patented Aug. 7, 1956

2,758,258
ELECTROLYTIC CAPACITOR

Joseph A. Bliss, Cumberland, and Paul C. Lakin, John W. Maxwell, and Henry B. Schoch, Indianapolis, Ind., assignors to P. R. Mallory & Co., Inc., Indianapolis, Ind., a corporation of Delaware Application May 21, 1953, Serial No. 356,356

14 Claims. (Cl. 317—230)

This invention relates generally to electric capacitors and has specific application to such apparatus including means and methods for providing electrolytic capacitors adapted for use with miniaturized electrical circuits or components.

In the progress of the electrical arts, especially as relating to communications and computers, electron tubes may be replaced by devices wherein electrons are controlled in a solid instead of in a vacuum. Since these devices are much smaller in physical character and structure and require different voltages applied thereto, it is desirable and often necessary that the components functionally associated with such devices be fabricated and constructed in reduced physical and electrical ratio. However, the speed of development in the construction of such miniaturized electrical components in accordance with the pace of the development of crystal amplifiers known as "transistors" has presented a great many problems.

Thus, with relation to electric capacitors, the fabrication of miniature capacitors requires different constructional features in the over-all aspect of component relationship. As an example, the conventional structural method for sealing electrolytic capacitors such as crimping down against a shoulder or bead formed in the case of a capacitor or by crimping the capacitor case against the side of a rubber plug would result in the seal occupying a relatively large volume of the capacitor. Another type of construction, therefore, must be found and used if the proper physical relationship between the components of the capacitor is to remain constant.

The present invention meets and overcomes several of the attendant problems created by the aforesaid aspects of miniaturization and affords a construction for the miniature electrolytic capacitor wherein a tight seal is obtained with very low weight loss using liquid electrolytes. Moreover, the novel seal occupies a relatively small volume of the total capacitor volume.

It is therefore an object of the present invention to provide a new and novel electrolytic capacitor having dimensions adapting the same for use with solid type electron amplifier devices and with circuits associated therewith; said circuits and solid-state amplifiers being usually of a dimension greatly at variance from those used in the conventional electron vacuum tube and/or circuit.

Still another object of the present invention is to provide a novel electrolytic capacitor for use with miniature circuit development of the solid-state type.

Yet another object of the present invention is to provide a novel, compact, efficient electrolytic capacitor for use with printed or miniature circuits and which is economical to fabricate and manufacture.

Still another object of the present invention is to provide a novel sealing construction for an electrolytic capacitor.

Another object of the present invention is to produce a low cost miniature electrolytic capacitor.

Still another object of the present invention is to improve the construction of electric capacitors, especially by providing means for sealing the same so as to adapt them for utility in small, miniature type circuits.

The invention accordingly comprises the features of construction, combination of elements, arrangement of parts and methods of manufacture referred to above and which will be further brought out and exemplified in the disclosure herein set forth, including the illustrations in the drawing, the scope of the invention being included in the appended claims.

The invention, in another of its aspects, relates to novel features of the instrumentalities described herein for teaching the principal objects of the invention and to the novel principles employed in the instrumentalities whether or not these features and principles may be used in the said objects and/or in the same field.

For illustrative purposes the invention will be described in connection with the accompanying drawing in which.

Generally speaking, the present invention provides a novel miniature capacitor operable in printed and solid type amplifier circuits. In the construction of the capacitor a construction is developed and determined so that sealing of the inert electrolyte within the case electrode can be accomplished in a manner such that a tight seal is given. Further, this seal is limited so that a relatively small volume of the total capacitor volume is occupied.

Figure 1:
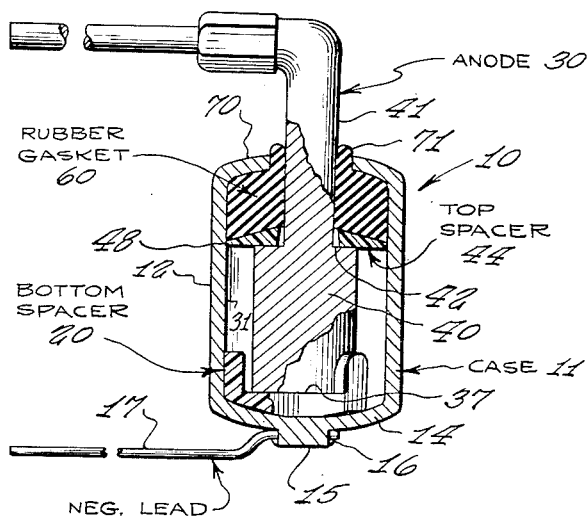
Fig. 1 is a vertical cross-sectional view of an embodiment of the novel miniature type electrolytic capacitor of the present invention, with a portion thereof shown in elevation and as particularly adapted to illustrate the constructional assembled features thereof.
Figure 2:
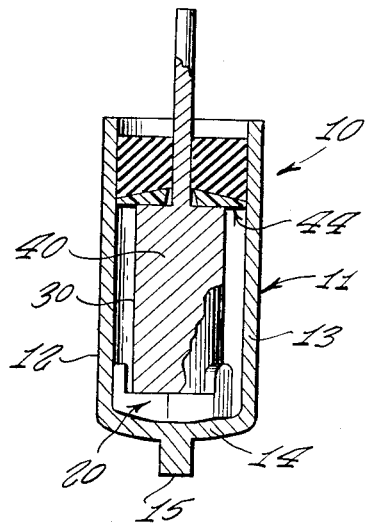
Fig. 2 is a vertical cross-sectional view of the embodiment of the invention as shown in Fig. 1, prior to spinning the top portion of the container, and as adapted to illustrate the mode of assembly of the individual components therein.

Reference now is directed to the details of the structure shown in the drawings, especially Figs. 1 and 2, where miniature electrolytic capacitor 10 is represented. The capacitor comprises a casing 11 made from metal in the shape of an open-ended can or cup. The casing, which may act as an electrode such as the cathode, here is shown as being fabricated of a fine silver sheet having elongated side walls 12 and 13 interconnected by a bottom, curved wall 14. Integrally connected thereto, substantially centered at the bottom wall 14 of the can and depending therefrom is a terminal post 15. Terminal post 15 has an aperture or slot 16 formed therein of a dimension such as to tightly contain a cathode lead wire 17 penetrating therethrough and confined thereby.

Figure 3:
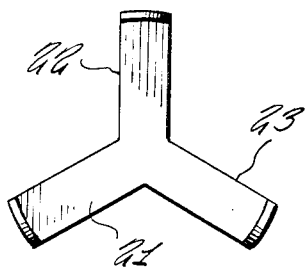
Figs. 3 and 3a are top plan and vertical cross-sectional views of the polystyrene bottom space used in the assembly of the miniature electrolyte capacitor of the present invention.
Figure 4:
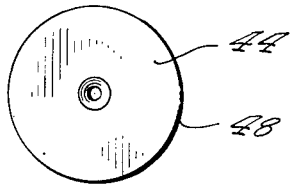
Figs. 4 and 4a are top plan and vertical cross-sectional views of the top spacer used in the fabrication of the miniature electrolytic capacitor of the present invention.
Figures 3A, 4A:

Fitted within container 11 is a novel bottom spacer 20 as shown in Figs. 3 and 3a. The spacer, which may be fabricated of polystyrene comprises a three-legged clutching and alignment member and includes a central flat portion of approximately .085" from which at radial points approximately 120° apart there extends individual arms 21, 22, 23, each of which is angulated or bent up from the central flat portion by an angle of approximately 15°±1.5° in a manner such as to conform the individual arms to the inside curvature of the bottom 14 of the container 11.

At the end of the individual arms away from the center portions and extending upright to the ends thereof substantially at 90° thereto are fingers or ears 24, 25, 26 respectively, whose inside surfaces such as 27 are adapted to form a cradle or centering support for the anode 30, as hereinafter described.

The outer surface, such as 29, of arms 21—23, runs along the inside wall surface 31 of wall 12 and 13 of the electrode container 11 to be tightly mounted between the bottom wall 14 and the side walls. The resilient construction of the spacer adapts the same for centering the anode pellet 40 of the electrolytic capacitor so as to keep the same from touching the case.

The anode 30 may comprise a cylindrical main portion of a sintered pellet or a helical sheet of tantalum 40 whose annular end wall 37 is adapted to be cupped within and rests on the inside of spacer 20 by fingers 24—26 thereof so as to be centered thereby and to prevent the pellet's surface from touching or contacting the electrode case. As stated, spacer 20 is retained within the container. The spacer 20 is made in a multilegged construction instead of a solid disk so as to allow a larger anode area to be in contact with the electrolyte. This is particularly true if the anode is a solid, such as a sintered pellet or anode cut from a rod. The material from which the spacer is fabricated is of good electrical insulating material, such as a plastic or ceramic which does not cold flow under operating conditions and is not attacked by the electrolyte.

Integrally connected to the center of anode pellet 40 is a rod or riser of tantalum 41. As joined to the pellet, an outside shoulder 42 is formed by rod 41 and the pellet. Over this shoulder 42, seated upon the same and circumscribing rod 41, is a top spacer 44. Spacer 44 is made of polystyrene and comprises a flat bottom surface 45, through the center of which is bored a tapered aperture adapted to be narrower at the top than at the bottom. Opposite to bottom flat surface 45 of spacer 44 is a top surface having a flat center section 46 from which radiates a sloped surface inclined therefrom at an angle of approximately 13.5–16.5°. The annular circumference 48 abuts the inner wall of the casing of the capacitor to aid in centering and holding pellet 40.

Surmounting the top spacer 44 is a gasket fabricated of rubber 60 or of an elastomeric material which has good resistance to permanent set, resistance to the electrolyte, and has low gas permeability. Butyl rubber has been found to give good results. When the case is crimped, the heretofore open end of the case is closed to form an annular top 70 having its center closed by a collar 71 of extruded gasket material tightly surrounding the anode riser of tantalum. When the gasket material is extruded from the open end it also presses down tightly against the top spacer. Since the top spacer rests on the anode, with the anode resting on the bottom spacer and the bottom spacer resting in turn on the case bottom, the force of the crimp is thus transferred to the bottom of the case. All the components are thus held very rigidly and compactly in place.

In order to assemble the novel electrolytic capacitor hereof the following procedures have been developed in accordance with which the final assembly may be accurately determined. First, the negative lead is staked or placed within the aperture of the bottom wall terminal of the casing so that there will be no swelling of the case due to the staking of the tab. The next step in the operation is to place the bottom spacer within the case next the bottom wall. The pellet sub-assembly including the top spacer and gasket 60 then takes place in the following manner: First, the top spacer of the assembly is placed over the anode riser with the tapered side of the spacer being placed away from the pellet. Then the rubber gasket is placed over the riser. The case is next filled with electrolyte and the pellet assembly inserted within the case and the electrolyte. It is to be noted that the rubber gasket must be below the lip of the case prior to crimping the same. The case is then crimped so as to extrude the gasket material and to allow it to flow out of the open center thereof and to grasp the positive lead tightly so as to circumscribe the anode riser tightly. The positive lead is then connected to the anode riser and if necessary the leads may be formed. Finally, the case is cleaned without the use of steam.

The electrolytic capacitor of the present invention, utilizable as a miniature component for printed circuits and other such apparatus, is merely illustrative and not exhaustive in scope and since many widely different embodiments of the invention may be made without departure from the scope thereof it is intended that all matter contained in the above description shown in the accompanying drawings shall be interposed as illustrative and not in a limiting sense.

What is claimed is:

1. An electrolytic capacitor for use in miniaturized circuits comprising a container acting as an electrode therefor, an electrolyte placed in said container, a spacer having a plurality of separated arms radiating from the center adapted to fit adjacent the bottom thereof, a second electrode held by said spacer away from said bottom of said container in said electrolyte, a conductor connected to said second electrode, a second spacer seated on the top of said second electrode circumscribing said conductor, a gasket surrounding said conductor above said second electrode, and closure means for said container of said capacitor, said means compressing said gasket to cause the same to tightly grip said conductor and hence firmly anchor and center said second electrode whereby said electrolytic capacitor is tightly sealed with an extremely large anode area adapted to be in contact with said electrolyte.

2. An electrolytic capacitor for use in miniaturized circuits comprising a container acting as a cathode therefor, an electrolyte placed in said container, an electrically insulative spacer having a plurality of separated arms radiating from the center adapted to fit at the bottom thereof, an anode held by said spacer and spaced from said bottom of said container by means of said spacer, a metal rod connected to said anode at the top thereof, a second spacer seated on the top of said anode circumscribing said rod, a gasket placed atop said second spacer surrounding said rod, and closure means for said container of said capacitor, said means compressing said gasket to cause the same to tightly grip said rod and hence firmly anchor and center said anode between said spacers, whereby said electrolytic capacitor is tightly sealed with an extremely large anode area adapted to be in contact with said electrolyte.

3. An electrolytic capacitor for use in miniaturized circuits comprising a silver container acting as a cathode therefor, an electrolyte placed in said container, a multilegged electrically insulative spacer adapted to fit at the bottom thereof, said spacer having arms separated from one another and radiating from a flat center, a tantalum pellet held by said spacer and spaced from said bottom of said container by means of said spacer, a tantalum rod connected to said pellet at the top thereof, a second spacer seated on the top of said pellet circumscribing said rod, a gasket placed atop said second spacer surrounding said rod, and closure means for said container of said capacitor, said means compressing said gasket to cause the same to tightly grip said rod and hence firmly anchor and center said tantalum pellet between said spacers, whereby said electrolytic capacitor is tightly sealed with an extremely large anode area adapted to be in contact with said electrolyte.

4. An electrolytic capacitor for use in miniaturized circuits comprising a silver container acting as a cathode therefor, a liquid electrolyte placed in said container, an electrically insulative spacer having a plurality of separated arms radiating from its center adapted to fit adjacent the bottom thereof, a cylindrical tantalum anode held by said spacer and spaced from said bottom of said container thereby, a tantalum rod connected to said anode at the top thereof substantially at the center thereof, a second spacer seated on the top of said pellet circumscribing said rod, a gasket placed atop said second spacer surrounding said rod, and closure means for said container of said capacitor, said means compressing said gasket to cause the same to tightly grip said rod and hence firmly anchor and center said tantalum anode between said spacers, whereby said electrolytic capacitor is tightly sealed with an extremely large anode area adapted to be in contact with said electrolyte.

5. An electrolytic capacitor for use in miniaturized circuits comprising a silver container acting as a cathode therefor, a liquid electrolyte placed in said container, an electrically insulative spacer adapted to fit adjacent the bottom thereof, said spacer having a plurality of separated arms radiating from the center each placed at an angle of approximately 120° from the other, a cylindrical anode held by said spacer and spaced from said bottom of said casing in said electrolyte by means of said spacer, a rod connected to said anode at the top and center thereof, a second spacer seated on the top of said anode circumscribing said rod, a rubber gasket atop said second spacer surrounding said rod, and closure means for said container of said capacitor, said means compressing said gasket to cause the same to tightly grip said rod and hence firmly anchor and center said anode between said spacers, whereby said electrolytic capacitor is tightly sealed with an extremely large anode area adapted to be in contact with said electrolyte.

6. An electrolytic capacitor for use in miniaturized circuits comprising a silver container acting as a cathode therefor, an electrolyte placed in said container, an electrically insulative spacer having a plurality of spaced arms radiating from a flat center piece, each of said arms having a finger extending therefrom substantially 90° thereto along the inside wall of said casing and adapted to fit against the bottom of said container, a tantalum pellet anode held by said arms and fingers of said spacer and raised from said bottom of said container by means of said spacer, a tantalum rod connected to said anode at the center and top thereof, a second polystyrene spacer seated on the top of said pellet circumscribing said rod, a gasket placed atop said second spacer surrounding said rod, and closure means for said casing of said capacitor, said means compressing said gasket to cause the same to tightly grip said rod and hence firmly anchor and center said tantalum anode between said spacers, whereby said electrolytic capacitor is tightly sealed with an extremely large anode area adapted to be in contact with said electrolyte.

7. An electrolytic capacitor for use in miniaturized circuits comprising a silver container acting as a cathode therefor, an electrolyte placed in said container, a multi-legged resilient polystyrene electrically insulative disc adapted to fit at the bottom thereof, each of said legs separated from each other at the outside circumference of the disc and joined at the center, said center thereof being substantially flat with said legs radiating therefrom bent up at an angle of approximately 13.5°–16.5°, a cylindrical tantalum pellet held by said disc and spaced away from said bottom of said container thereby, a tantalum rod connected to said pellet at the top thereof, a second spacer seated on the top of said pellet circumscribing said rod, a gasket placed atop said second spacer surrounding said rod, and closure means for said casing of said capacitor, said means compressing said gasket to cause the same to tightly grip said rod and hence firmly anchor and center said tantalum pellet between said spacers, whereby said electrolytic capacitor is tightly sealed with an extremely large anode area adapted to be in contact with said electrolyte.

8. An electrolytic capacitor for use in miniaturized circuits comprising a silver container acting as a cathode therefor, an electrolyte placed in said container, a resilient polystyrene electrically insulative disc having three legs adapted to fit at the bottom thereof, each of said legs separated from each other at the outside circumference by approximately 120° and joined at the center, said center thereof being substantially flat with said legs radiating therefrom bent up at an angle of approximately 13.5°–16.5°, a cylindrical tantalum pellet held by said disc and spaced away from said bottom of said container thereby, a tantalum rod connected to said pellet at the top thereof, a second insulative disc having a bore therethrough seated on the top of said pellet, said rod passing through said bore, a gasket placed atop said second disc surrounding said rod, and crimped closure means for said container of said capacitor, said means compressing said gasket at the top of said container to cause the same to tightly grip said rod and hence firmly anchor and center said tantalum pellet between said discs, whereby said electrolytic capacitor is tightly sealed with an extremely large anode area adapted to be in contact with said electrolyte.

9. An electrolytic capacitor for use in miniaturized circuits comprising a silver container acting as a cathode therefor, an electrolyte placed in said container, a multi-legged resilient polystyrene electrically insulative spacer adapted to fit against the bottom thereof, each of said legs separated from each other at the outside circumference of the spacer and joined at the center, said center thereof being substantially flat with said legs radiating therefrom bent up at an angle of approximately 13.5°–16.5°, said legs each having a finger portion tightly placed against the inside surface of said container, a cylindrical tantalum pellet held by said spacer and spaced away from said bottom of said container thereby, a tantalum rod connected to said pellet at the top center thereof, a second spacer fabricated of polystyrene seated on the top of said pellet circumscribing said rod, said spacer having a tapered hole through its center, a gasket placed atop said second spacer surrounding said rod, and closure means for said container of said capacitor, said means compressing said gasket to cause the same to tightly grip said rod and hence firmly anchor and center said tantalum pellet between said spacers, whereby said electrolytic capacitor is tightly sealed with an extremely large anode area adapted to be in contact with said electrolyte.

10. An electrolytic capacitor for use in miniaturized circuits comprising a silver container acting as a cathode therefor, an electrolyte placed in said container, a multi-legged resilient polystyrene electrically insulative spacer adapted to fit against the bottom thereof, each of said legs separated from each other at the outside circumference of the spacer and joined at the center, said center thereof being substantially flat with said legs radiating therefrom bent up at an angle of approximately 13.5°–16.5°, said legs each having a finger portion tightly placed against the inside surface of said container, a cylindrical tantalum anode held by said spacer and spaced away from said bottom of said container thereby, a tantalum rod connected to said anode at the top center thereof, a second spacer fabricated of polystyrene seated on the top of said anode circumscribing said rod, said spacer having a tapered hole through its center and having a central flat portion and an inclined surface extending therefrom, a gasket placed atop said second spacer surrounding said rod, and closure means for said container of said capacitor, said means compressing said gasket to cause the same to tightly grip said rod and hence firmly anchor and center said tantalum anode between said spacers, whereby said electrolytic capacitor is tightly sealed with an extremely large anode area adapted to be in contact with said electrolyte.

11. A method of assembling sub-miniature electrolytic capacitors, including an outside container cathode, an electrolyte, an anode having a conductor connected thereto, a plurality of spacers, and a gasket comprising the steps of placing one of said spacers in said container adjacent the bottom thereof, filling said container with electrolyte, placing a second spacer at the top of said anode, placing said gasket on top of said latter spacer to form an anode assembly, inserting said anode assembly within said container on said first spacer to be held thereby away from the bottom of said container, compressing the top of said container so as to compress said gasket so as to extrude the same and, concurrently sealing the top of said container by closing the top of said container about said gasket.

12. A method of assembling sub-miniature electrolytic capacitors including an outside container cathode, an electrolyte, an anode having a rod connected thereto, a plurality of spacers, and a gasket, comprising the steps of placing one of said spacers in said container adjacent the bottom thereof, filling said container with electrolyte, placing a second spacer about said rod at the top of said anode, surrounding said rod by said gasket, placing said gasket on top of said latter spacer to form an anode assembly, inserting said anode assembly within said container onto said first spacer to be held thereby away from the bottom of said container, compressing the top of said container about said gasket, extruding the same and concurrently sealing the top of said container by crimping the top of said container tightly about said gasket.

13. An electrolytic capacitor for use in miniaturized circuits comprising a container acting as an electrode therefor, an electrolyte placed in said container, a spacer having a plurality of separated arms radiating from a flat center adapted to fit against the bottom thereof, a tantalum electrode held by said spacer away from said bottom of said container in said electrolyte, a conductor connected to said tantalum electrode, a gasket surrounding said conductor connected to said tantalum electrode, and closure means for said container of said capacitor, said means compressing said gasket to cause the same to tightly grip said conductor and hence firmly anchor and center said tantalum electrode, whereby said electrolytic capacitor is tightly sealed so as to give an extremely large anode area adapted to be in contact with said electrolyte therein.

14. An electrolytic capacitor for use in miniaturized circuits comprising a container acting as an electrode therefor, an electrolyte placed in said container, a spacer having a plurality of separated arms radiating from a center adapted to fit adjacent to the bottom thereof, a tantalum electrode held by said spacer away from said bottom of said container in said electrolyte, a conductor connected to said tantalum electrode, a second spacer seated on the top of said tantalum electrode circumscribing said connected conductor, sealing means circumscribing said conductor above said tantalum electrode cooperating with said spacer means to block the flow of electrolyte, and closure means for said container of said capacitor, said closure means compressing said second spacer and sealing means above said tantalum electrode so as to tightly grip said conductor connected to said electrode and firmly anchor and center the same within said container and to seal the electrolytic capacitor in a manner such as to afford an extremely large anode area making contact with the electrolyte therein.

References Cited in the file of this patent
UNITED STATES PATENTS

| | | |
|---|---|---|
| 2,157,629 | Ralph | May 9, 1939 |
| 2,616,953 | Booe | Nov. 4, 1952 |